Aug. 14, 1962 A. C. MAMO 3,049,027
TRANSMISSION
Filed Feb. 5, 1957 5 Sheets-Sheet 5
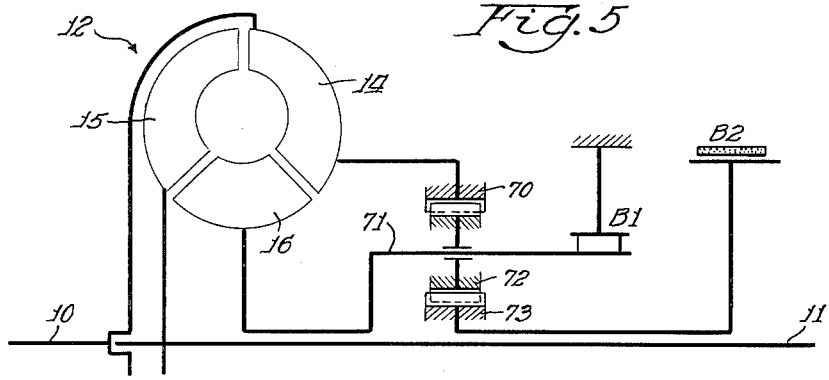
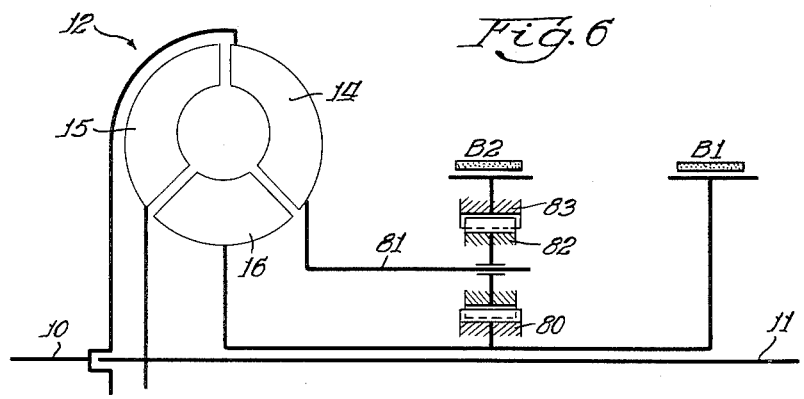
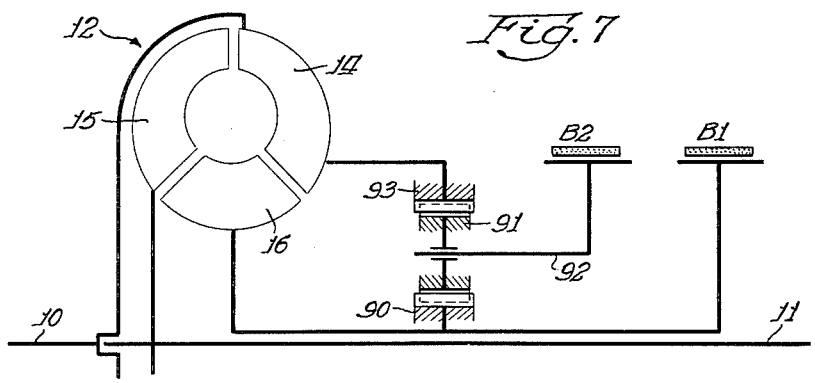
Inventor:
Anthony C. Mamo
By:
Frank C. Parker  Atty.

United States Patent Office 3,049,027
Patented Aug. 14, 1962

3,049,027
TRANSMISSION
Anthony C. Mamo, Detroit, Mich., assignor to Borg-Warner Corporation, Chicago, Ill., a corporation of Illinois
Filed Feb. 5, 1957, Ser. No. 638,332
46 Claims. (Cl. 74—677)

The present invention relates to transmission devices and is more particularly concerned with transmission devices utilizing hydraulic torque converters.

The principal object of the present invention is to provide transmission mechanism utilizing a hydraulic torque converter comprising relatively rotatable vaned members which together define a substantially toroidal fluid circuit, wherein the vaned members comprise at least driving, driven and reaction members for respectively imparting kinetic energy to the fluid, absorbing kinetic energy from the fluid and changing the direction of flow of the fluid prior to its reentry into the driving member; in combination with gearing drivingly interconnected between a plurality of the torque converter members and adapted to receive an infinitely variable portion of the torque on one of the torque converter members, vary this portion of torque and retransmit the varied portion of torque back to another of the torque converter members to thereby provide infinitely variable operating conditions of the converter substantially different from those of the converter alone when operated in the conventional manner with the reaction member either held fixed throughout the entire range of operation or allowed to rotate forwardly after the driven-to-driving member torque ratio reaches substantially one-to-one.

It is common practice to tilt the stator blades in conventional torque converters as far forwardly as possible with the intent of obtaining maximum efficiency and the highest possible clutch point. As will be readily apparent there are definite physical limitations to the degree of forward tilting which may be applied to the stator blades. These limitations arise by reason of the fact that as the blades are tilted more and more forwardly they physically approach each other and thus effectively block the flow of fluid out of the stator into the impeller. As a result, the degree of forward thrust which can be imparted to the fluid as it leaves the stator blades is definitely limited.

Further, it is well known that in conventional torque converters using a single set of stator blades these blades or vanes are incapable of directing the fluid into the impeller at other than substantially the same flow angle throughout the entire torque conversion range of the converter.

If the conventional converter were modified in order to improve performance near the converter clutch point by tilting the stator vanes so that they direct the fluid into the impeller with a greater than normal forward component, this would unload the impeller so that the engine would rotate at a higher speed over the entire torque conversion range. At stall, then, with this converter, the speed of rotation of the engine would be unacceptably high. This unloading of the impeller would also lower the torque handling capacity of the converter and prevent the delivery of the desired high torque at the low speed ratio end of the torque conversion range.

A more detailed object of the present invention is to provide transmission mechanism combining a hydraulic torque converter and gearing wherein the torque ratio between the input member of the combined torque converter and gearing and the output member of the combined torque converter and gearing is infinitely variable throughout a substantially greater portion of the input to output member range of speed ratios.

Another object of the present invention is to provide transmission mechanism comprising a hydraulic torque converter interconnected with planetary gearing in such a manner that when the planetary gearing is selectively controlled in different ways, the combined torque converter and gearing are capable of providing a plurality of ranges of infinitely variable torque conversion.

A more specific object in connection with the immediately preceding general object of the invention, is to provide planetary gearing interconnected between the input and reaction elements of the hydraulic torque converter, so that by holding different ones of the elements of the planetary gearing stationary different infinitely variable torque conversion ranges will be provided.

In a conventional hydraulic torque converter utilizing vaned impeller, turbine and reaction means which together define a substantial toroidal fluid circuit, the impeller imparts kinetic energy to the fluid, the turbine absorbs hydraulic energy from the fluid and in so doing changes the direction of flow of the fluid to a more reverse direction, and the reaction member redirects the fluid from a relatively reverse direction to a relatively forward direction prior to its reentry into the impeller member. It is conventional practice to utilize a converter of this general type in transmission devices and, particularly, in the automotive applications, a one-way brake is provided under the reaction member which prevents the reaction member from rotating reversely and allows it to rotate forwardly to thereby enable the torque converter to function substantially as a fluid coupling, the torque ratio being one-to-one, whenever the fluid leaving the turbine travels in a sufficiently forward direction to urge the reaction member relatively forwardly.

The present invention contemplates the provision of planetary gearing drivingly interconnected between the stator or reaction member and the impeller or driving member of the hydraulic torque converter in order to absorb part of the torque on the impeller member and multiply this torque and, in turn, transmit it to the reaction member. The reaction member is then caused to rotate forwardly or reversely in order to vary the operating characteristics of the converter.

Due to the nature of the transmission arrangements disclosed herein, each of which is employed in a manner whereby the planetary gearing receives only a fraction of the engine torque, rather than a multiple of engine torque, as is the case with a conventional transmission, the gearing need not be nearly so rugged and can therefore be smaller and cheaper than the gearing in conventional transmissions.

The different infinitely variable torque conversion ranges provided by the aforesaid interconnection of planetary gearing with the hydraulic torque converter afford different overall efficiencies and turbine to impeller torque ratios with maximum efficiencies at different portions of the range of turbine-to-impeller speed ratios.

Another object of the present invention is to provide means for controlling the planetary gearing in such a manner as to cause operation of the converter and gearing in different ones of said infinitely variable torque conversion ranges in accordance with variations in turbine-to-impeller speed ratio so as to thereby take advantage of the efficiency maximums and the desired torque ratio characteristics at the different turbine-to-impeller speed ratios corresponding to said different torque conversion ranges.

Another rather general object of the present invention is to provide different arrangements for interconnecting a hydraulic torque converter and planetary gearing in a manner which will improve the overall efficiency, provide increased infinitely variable torque ratio and, at the same time, provide infinitely variable torque conversion over a range of turbine-to-impeller speed ratios which are higher than ordinarily capable with hydraulic torque converters of this general type. In this connection, by utilizing this principle of the invention in automotive vehicle transmissions, the transmission would be capable of providing infinitely variable torque multiplication over a much greater range of vehicle speeds than has been possible heretofore with prior arrangements of this general type.

A specific advantage of transmission mechanism of the type disclosed herein is that it provides a K factor curve which has a much greater range than conventional torque converters, the K factor being a quantity equal to input speed divided by the square root of input torque. This means that the clutch point (torque ratio of one-to-one) is extended to a higher turbine-to-impeller speed ratio and thus the transmission provides an assist over a greater operating range.

The value of the K factor at the clutch point minus the value of the K factor at stall is designated as the span of a converter which is directly proportional to the range over which a converter is able to multiply torque. An advantage of the present invention is that the arrangement provides a very substantial increase in the span.

In a number of industrial and tractor type applications for hydraulic torque converters it is necessary to operate the torque converter without a free wheel unit under the reaction element because of the fact that the reaction element is subjected to such extreme reaction torques under certain operating conditions. As is well known, at high turbine-to-impeller speed ratios the efficiency of a torque converter having a stationary stator drops off very substantially and the present invention overcomes this undesirable feature by combining the torque converter with planetary gearing in such a way that the free wheel unit under the reaction element can be eliminated without the usual drop in the efficiency at high turbine-to-impeller speed ratios.

Due to the improved efficiencies of the present arrangement in the high turbine-to-impeller speed ratio range the heat generation for any given input torque is substantially reduced.

With the present arrangement of the torque converter and gearing the gearing can be controlled in such a manner as will provide a drive without slip between the turbine and the impeller without the conventional efficiency loss.

The foregoing general objects and advantages of the present invention will become apparent from the following detailed description of some illustrative embodiments shown in the appended drawings, wherein:

FIGS. 5, 6 and 7 are schematic diagrams illustrating modified arrangements for interconnecting a typical three element hydraulic torque converter with planetary gearing in order to provide multiple infinitely variable torque conversion ranges.

Figure 1:
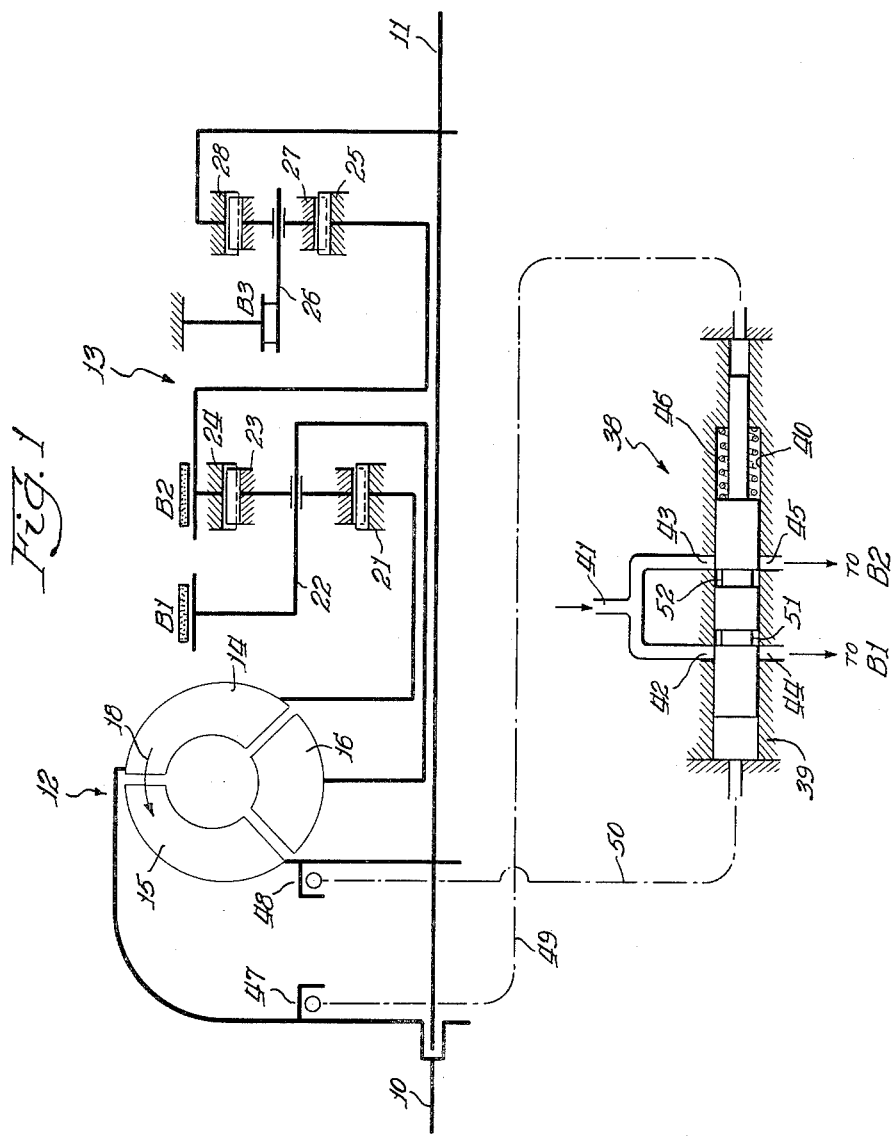
FIG. 1 is a schematic view of one form of the invention.

With reference now to the drawings, and with particular reference to FIG. 1, the transmission mechanism disclosed therein comprises an input or driving shaft 10, an output or driven shaft 11, a hydraulic torque converter designated generally by reference numeral 12, and planetary gearing designated generally by reference numeral 13.

The hydraulic torque converter 12 comprises a vaned impeller 14, a vaned turbine 15 and a vaned stator or reaction member 16. Each of the vaned converter members 14, 15 and 16 has an outer and an inner shell member which, when all are taken together, provide a torus. The torus defined by the torque converter member shells is filled with fluid under pressure and the impeller vanes 14 are adapted to rotate directly with the drive shaft 10 in order to impart forward rotational movement to the fluid, as designated by the reference arrows 17a—17e in FIG. 2 at the same time as the impeller imparts toroidal motion to the fluid, as designated by reference arrow 18 in FIG. 1. Thus, it will be seen that the impeller vanes 14 impart kinetic energy to the fluid circulating toroidally through the torque converter 12.

Figure 2:
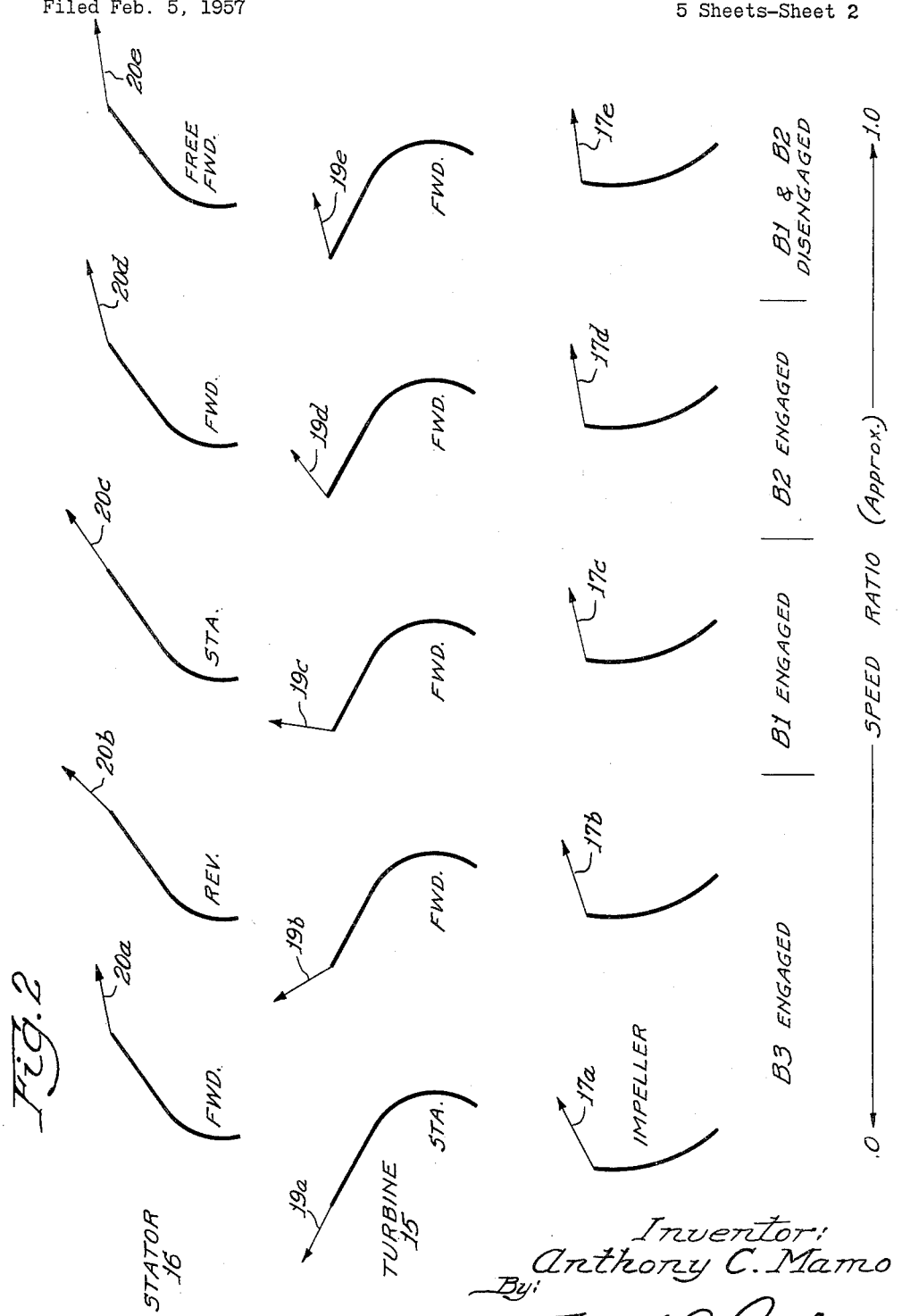
FIG. 2 is a schematic diagram illustrating the conditions of operation prevailing within the hydraulic torque converter of FIG. 1 during different infinitely variable torque conversion ranges.

The turbine vanes 15 are shaped generally as shown in FIG. 2 and are adapted to absorb kinetic energy from the fluid in order to drive the driven shaft 11 directly connected therewith. The reference arrows 19a—19e in FIG. 2 represent the rotational direction of flow of the fluid as it leaves the turbine vanes 15.

The fluid, upon leaving the turbine vanes 15, enters the stator and is redirected in a more forwardly direction by the stator vanes 16 prior to the re-entrance of the fluid into the impeller. The reference arrows 20a—20e designate the rotational direction of flow of the fluid leaving the stator vanes under different conditions of operation.

The planetary gearing 13 is operatively interconnected between the impeller vanes 14 and the stator vanes 16. The planetary gear 13 comprises a front planetary gear set consisting of a sun gear 21 which is connected to rotate directly with the impeller 14, a planet pinion carrier 22 connected to rotate directly with the stator 16, a plurality of planetary pinion gears 23 carried by the carrier 22 and respectively adapted to mesh with sun gear 21, and a ring gear 24 disposed in mesh with each of the planet pinion gears 23.

The planetary gearing 13 also includes a rear planetary gear set comprising a sun gear 25 connected to rotate directly with the ring gear 24 of the front gear set, a planet pinion carrier 26 for carrying a plurality of planetary pinions 27 which respectively mesh with the sun gear 25, and a ring gear 28 in mesh with each of the pinions 27 and directly connected with driven shaft 11 and, in turn, with the turbine 15.

A plurality of control devices for the planetary gearing 13 are provided. These control devices comprise a brake B1 for the planetary carrier 22 and stator 16, a brake B2 for the ring gear 24 and a one-way brake B3 for the planet pinion carrier 26. The one-way brake B3 is adapted to prevent reverse rotation of the pinion carrier 26 but will allow the pinion carrier to rotate freely forwardly.

Figure 3:
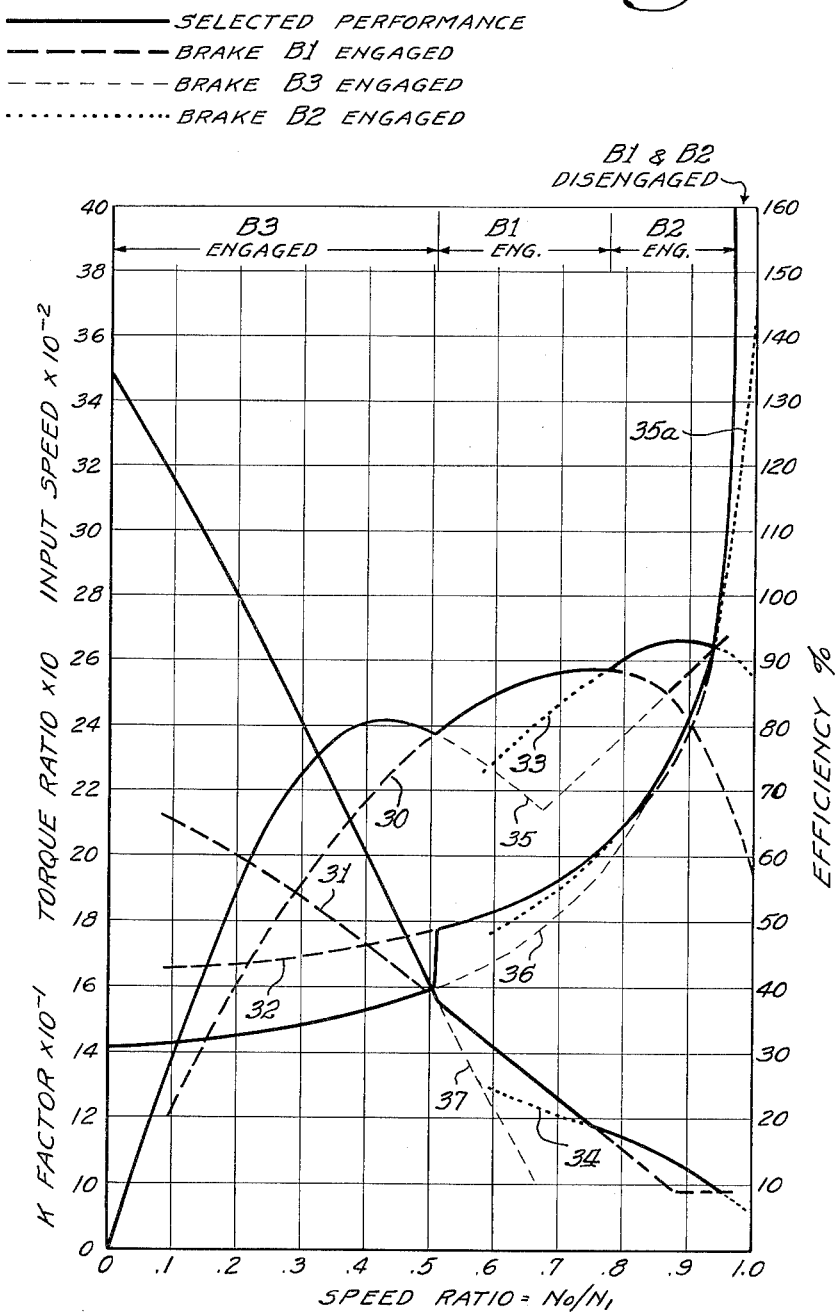
FIG. 3 is a diagram showing typical performance characteristics of transmission mechanism, as shown in FIG. 1.

When the brakes B1, B2 and B3 are selectively actuated or engaged in order to hold the associated planetary gearing element stationary, the torque converter 12 respectively provides different infinitely variable ranges of torque conversion. Reference to FIG. 3 of the drawings will illustrate the efficiencies, torque ratios and K factors for the different ranges of infinitely variable torque conversion provided by the combined torque converter and gearing in response to the selective actuation of the control devices B1, B2 and B3.

The operation of the combined torque converter 12 and gearing 13 with the respective brakes B1, B2 and B3 selectively engaged will now be described.

When brake B1 is engaged, the carrier 22 and stator 16 are stationary and the torque converter 12 functions in precisely the manner in which a three element torque converter with a stationary stator or reaction element will function. The efficiency curve for the combined torque converter and gearing corresponding to the conditions of operation with the brake B1 engaged is represented by the dashed efficiency curve 30 in FIG. 3. The torque ratio curve plotted against turbine-to-impeller speed ratio, under the conditions of operation when brake B1 is engaged, is represented by the dashed torque ratio curve 31, while the K factor curve for the combined torque converter and gearing when operating with brake B1 engaged is represented by the K factor curve 32. It will be understood that the efficiency values are percentages and represent the product of the turbine-to-impeller speed ratio and turbine-to-impeller torque ratio multiplied by 100. The torque ratio curve 31 represents the turbine-to-impeller torque ratio plotted against the turbine-to-impeller speed ratio and the K factor curve 32 represents the value of the quantity $$\left\{ \sqrt{\frac{\text{input speed}}{\text{input torque}}} \right\}$$

plotted against turbine-to-impeller speed ratio.

When the band or brake B1 is engaged, the sun gear 21 rotates with the drive shaft 10 and impeller 14 in a forward direction and this causes the ring gear 24 to rotate reversely and carry with it the sun gear 25 in a reverse rotational direction. Inasmuch as it is contemplated that the brake B1 will not be engaged until a rather high turbine-to-impeller speed ratio, at the actual time when the brake B1 is engaged, the ring gear 28 will rotate forwardly at a speed sufficient to cause the carrier 26 to either remain stationary or rotate slightly forwardly even though the sun gear 25 rotates reversely.

When the band B2 is enaged to hold the ring gear 24 stationary, the sun gear 21 rotates forwardly with the impeller 14 and the planet pinion carrier 22 is caused to rotate forwardly and carry the stator 16 with it. Thus the stator 16 rotates in a forward direction but slower than the impeller 14 while the band B2 is engaged. At this time, rotation of the turbine causes the driven shaft 11 and rear ring gear 28 to rotate forwardly and the carrier 26 merely planetates around the stationary sun gear 25, the brake B3 being automatically disengaged or automatically overrunning in a forward direction.

The forward rotation of the stator 16, due to the multiplication of torque by the front planetary gear set while the band B2 is engaged, causes the fluid circulating toroidally within the converter 12 to be deflected in a more forwardly direction prior to reentering the impeller 14 than is the case when the stator 16 is stationary. The operating characteristics of the converter and gearing with the band B2 engaged are represented by the dotted lines in FIG. 3, the efficiency curve being designated by reference numeral 33, the torque ratio curve being designated by reference numeral 34 and the K factor curve being designated by reference numeral 35a.

When both bands B1 and B2 are disengaged, the rear planetary gear carrier 26 functions as a reaction element for the planetary gearing 13. At stall, with the turbine 15 and driven shaft 11 stationary, the rear ring gear 28 is stationary and accordingly, the rear sun gear 25 and front ring gear 24 are stationary. Thus, the forward rotation of the sun gear 21 with the impeller 14 at stall, causes the planet pinions 23 to planetate within the stationary ring gear 24, and the carrier 22 and stator 16 rotate forwardly. This has the effect of deflecting the fluid more forwardly prior to its re-entry into the impeller 14.

As soon as the turbine 15 picks up speed in a forward direction, the driven shaft 11 and ring gear 28 commence rotating forwardly and the reaction on the planet pinion carrier 26 is in a reverse direction so that the latter is held stationary due to the locking up of the one-way brake B3. The rear sun gear 25 thus rotates reversely and carries with it the front ring gear 24. Thus, the ring gear 24 rotates reversely while the sun gear 21 rotates forwardly and the carrier 22 and stator 16 rotate at a differential speed determined by the relative peripheral speeds of the ring gear 24 and the sun gear 21. Actually, the front gear set has a predetermined sun gear-to-ring gear speed ratio and the rear gear set likewise has a predetermined sun gear-to-ring gear speed ratio and whenever the rotational speed of the impeller 14 and sun gear 21 exceeds the product of the rotational speed of the turbine 15, multiplied by the ring gear-to-sun gear ratio of the front planetary gear set times the ring gear-to-sun gear ratio of the rear planetary gear set the carrier 21 and stator 16 will rotate forwardly. If the speed of rotation of the impeller 14 is less than the product of the speed of the turbine 15 multiplied by the ring gear-to-sun gear ratio of the front planetary gear set times the ring gear-to-sun gear ratio of the rear planetary gear set, the stator 16 will rotate reversely. Obviously, at stall the stator 16 will rotate forwardly at its greatest speed relative to the speed of rotation of the impeller 14 and as the turbine 15 picks up speed, in order to cause the front ring gear 24 to rotate reversely at an increasing speed, the stator 16 will rotate more slowly forwardly, gradually becoming stationary. As the speed of the turbine 15 becomes still greater, relative to the speed of the impeller, the stator 16 will commence rotating in a reverse direction and the speed of this reverse rotation will continually increase.

The operating characteristics of the converter and gearing when the bands B1 and B2 are disengaged and the one-way brake B3 is engaged, are designated by the curves represented by short dashed lines in FIG. 3. The efficiency curve corresponding to this range of operation is represented by reference numeral 35, the K factor curve by reference numeral 36 and the torque ratio curve by reference numeral 37.

Examination of FIG. 3 will show that the overall efficiency of the converter and gearing, with the brake B3 engaged, reaches a maximum at a turbine-to-impeller speed ratio of between 0.4 and 0.5 but that the efficiency rapidly drops off above about 0.5 until the clutch point is reached at approximately 0.67 speed ratio. The torque ratio, as represented by the line 37, under these conditions of operation is high at stall and drops off rather rapidly to the clutch point at about 0.67 speed ratio.

The efficiency of the combined torque converter and gearing is at a maximum with the stator 16 held in intermediate speed ratios while the efficiency with the band B2 engaged is at a maximum at relatively high speed ratios. Similarly, the torque ratio does not fall off to one-to-one with the band B2 engaged until a speed ratio of about 0.94 or 0.95 is reached. Thus, it will be seen that by selectively controlling the bands B1 and B2 so as to, in turn, also control the engagement of the one-way brake B3, advantage can be taken of the increased efficiencies of the different infinitely variable torque conversion ranges afforded by the transmission mechanism.

In order to control the engagement of brake bands B1 and B2 it is only necessary that means responsive to the turbine-to-impeller speed ratio be provided. Such means can be relatively simple as it is not critical that the precise point of engagement and disengagement of the bands be invariable, due to the infinitely variable characteristics of the operation of the transmission mechanism. Thus, one satisfactory means of controlling the engagement of bands B1 and B2 is disclosed in FIG. 1 and will now be described. This means comprises a valve 38 mounted within a suitable valve housing 39. The valve 38 is reciprocable within a bore 40 formed within the housing 39 and a fluid pressure supply line 41 communicates with the bore 40 at ports 42 and 43. Exit ports 44 and 45 respectively lead to actuating motors for brake bands B1 and B2. Fluid pressure is adapted to be applied to both ends of the valve 38, a spring 46 being provided for returning the valve 38 to its leftward position when the impeller 14 and turbine 15 are stationary. A pair of fluid pressure collector members 47 and 48 are respectively mounted to rotate with the impeller 14 and turbine 15 and fluid conduits 49 and 50 respectively lead from these collector members 47 and 48 to the opposite ends of the valve bore 40. Thus, at stall when the speed ratio is zero, fluid pressure from collector ring 47 acts on the right end of the valve 38 in conjunction with the spring 46 to hold the valve in its leftward position to hold the ports 44 and 45 both closed. As the turbine 15 picks up speed and reaches a speed where the turbine-to-impeller speed ratio is approximately 0.51, the pressure in the collector ring 48 increases sufficiently to urge the valve 38 to the right so that groove 51 interconnects supply port 42 and exit port 44 leading to the actuating motor for band B1. At a speed ratio of approximately 0.76 the valve 38 moves to the right even further, disconnecting ports 42 and 44 and interconnecting ports 43 and 45 through groove 52, in order to effect application of brake B2.

Thus, with the control valve 38 in FIG. 1 operative to control the selective engagement of brake bands B1 and B2, it will be understood that the one-way brake B3 holds the rear carrier 26 stationary to provide a reaction point for the planetary gearing 13 for speed ratios from stall up to approximately 0.51. The efficiency for this range of operation is designated by the heavy black portion of efficiency curve 35 while the torque ratio and K factor curves for this infinitely variable range of torque conversion are respectively designated by the heavy blackened portions of curves 37 and 36. At the point where the brake band B1 becomes engaged, namely, approximately 0.51 speed ratio, the stator 16 is stationary and the torque converter 12 functions without any effect from the planetary gearing, as the one-way brake B3 overruns, allowing all of the gearing elements to idle with respect to each other. The efficiency, torque ratio and K factor curves for this infinitely variable range of torque conversion are respectively designated by the heavy blackened portions of curves 30, 31 and 32.

When the turbine-to-impeller speed ratio reaches approximately 0.76, the valve 38 moves sufficiently to effect engagement of brake band B2 to cause a different infinitely variable range of torque conversion to become effective and the efficiency, torque ratio and K factor curves for this range of operation are respectively designated by the heavy blackened portions of curves 33, 34 and 35a.

Above a turbine-to-impeller speed ratio of approximately 0.94 or 0.95 the efficiency begins to drop with band B2 engaged, and likewise the torque ratio drops below one-to-one. When it is not desirable to trade this lower efficiency for a higher speed ratio, the valve 38 need only be moved sufficiently further to the right to block both ports 44 and 45 to cause disengagement of brake B2 above a speed ratio of approximately 0.94. Thus, the converter and gearing elements will all rotate forwardly at approximately the same speed and the net effect is that the converter will be functioning substantially as a fluid coupling above 0.94 speed ratio.

It will be understood that while the one-way brake B3 is normally engaged during relatively low turbine-to-impeller speed ratios, the entire planetary gearing 13 is infinitely variable in its effect upon converter 12 as the effect is to cause forward rotation of the stator 16 at stall and actual reverse rotation of the stator 16 at 0.51 turbine-to-impeller speed ratio. The impeller is thus initially loaded by a maximum amount and this unloading is infinitely variable with increasing turbine-to-impeller speed ratios to a minimum at approximately 0.51 speed ratio. Reference to FIG. 2 will show how the stator 16 rotates forwardly at stall and thereby deflects the fluid slightly forwardly, as represented by arrow 20a, whereas at 0.51 speed ratio the stator 16 rotates reversely and the effect is to deflect the fluid prior to its entry into the impeller vanes somewhat less forwardly, as designated by reference arrow 20b. Reference arrows 17a and 17b represent the direction in which the fluid leaves the impeller 14 respectively at stall and at approximately 0.51 turbine-to-impeller speed ratio, whereas reference arrows 19a and 19b represent the direction in which the fluid leaves the turbine 15 under the same conditions.

When the brake band B1 is engaged at approximately 0.51 turbine-to-impeller speed ratio, the stator 16 is thereby held stationary and the fluid leaves the stator in approximately the same direction as the exit angle for each of the stator vanes. This direction is designated by reference arrow 20c in FIG. 2, while the fluid leaves the impeller and turbine as respectively represented by arrows 17c and 19c. When the brake band B2 is engaged, the stator 16 is forced to rotate forwardly at some ratio of the impeller speed, depending upon the ring gear 24 to sun gear 21 tooth ratio, and this causes the fluid to enter the impeller 14 in a somewhat forward direction as designated by reference arrow 20d. The fluid leaves the impeller and turbine as represented by arrows 17d and 19d. When both bands B1 and B2 are disengaged, at approximately .94 speed ratio, brake B3 also overruns and all of the planetary gearing elements and torque converter elements rotate forwardly at substantially the same speed. Under these conditions the fluid leaves the stator vanes 16 in a direction such as is designated by reference arrow 20e, the impeller as shown by arrow 17e and the turbine as shown by arrow 19e.

Figure 4:
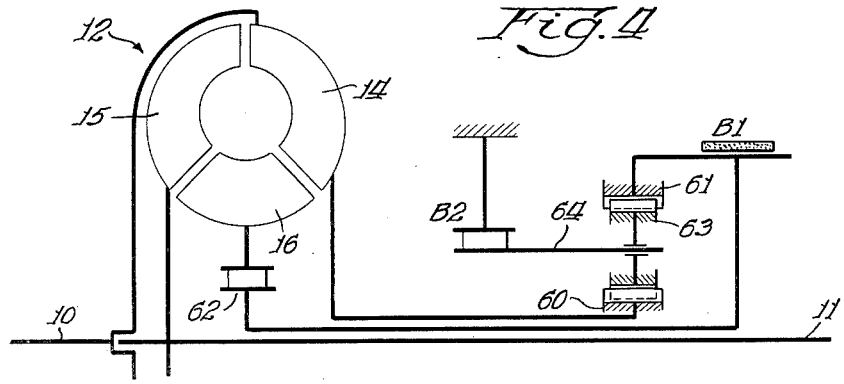
FIG. 4 is a schematic diagram of a modified form of the invention.

FIG. 4 shows another means of interconnecting a three element hydraulic torque converter with planetary gearing for providing multiple infinitely variable torque conversion ranges between the drive shaft 10 and the driven shaft 11. In FIG. 4 the impeller vanes 14 are drivingly interconnected with a sun gear 60, the turbine 15 is directly connected with the driven shaft 11, and the stator 16 is connected with a ring gear 61 through the intermediary of a one-way engaging device 62 which permits the stator 16 to rotate forwardly relative to the ring gear 61. The planetary gearing also includes a plurality of pinions 63 which respectively mesh with the sun gear 60 and ring gear 61 and the pinions 63 are carried by a planet pinion carrier 64 which is held against reverse rotation by means of a one-way brake B2. A second control device in the form of a band brake B1 is provided for holding the ring gear 61 stationary and when this brake B1 is engaged the stator 16 is free to rotate forwardly but is prevented from rotating reversely.

In the FIG. 4 arrangement, when the brake band B1 is disengaged, the one-way brake B2 which acts to hold the carrier 64 from reverse rotation functions as the reaction element and with the impeller 14 and sun gear 60 rotating forwardly, at stall, hydraulic energy tends to urge the stator 16 reversely, carrying with it the ring gear 61. The stator 16 can rotate reversely at a predetermined speed, dependent upon the ring gear to sun gear ratio. Beyond .71 turbine-to-impeller speed ratio, the tendency will be for the reaction carrier 64 to rotate forwardly which is permitted by the disengagement of the one-way brake B2.

When the band B1 is applied, the stator 16 is held against reverse rotation and the torque converter at this time provides another range of torque conversion. Under these conditions of operation, as soon as the fluid leaving the turbine does so with a sufficiently forward component, the stator vanes 16 will be driven forwardly, which forward motion is permitted by the free wheeling of the one-way engaging device 62. Under these conditions of operation, the planetary gearing merely idles as the sun gear 60 is carried with the impeller 14 and this urges the pinions 63 and carrier 64 in a forward direction, which is permitted by the disengagement of the one-way brake B2.

Figure 4A:
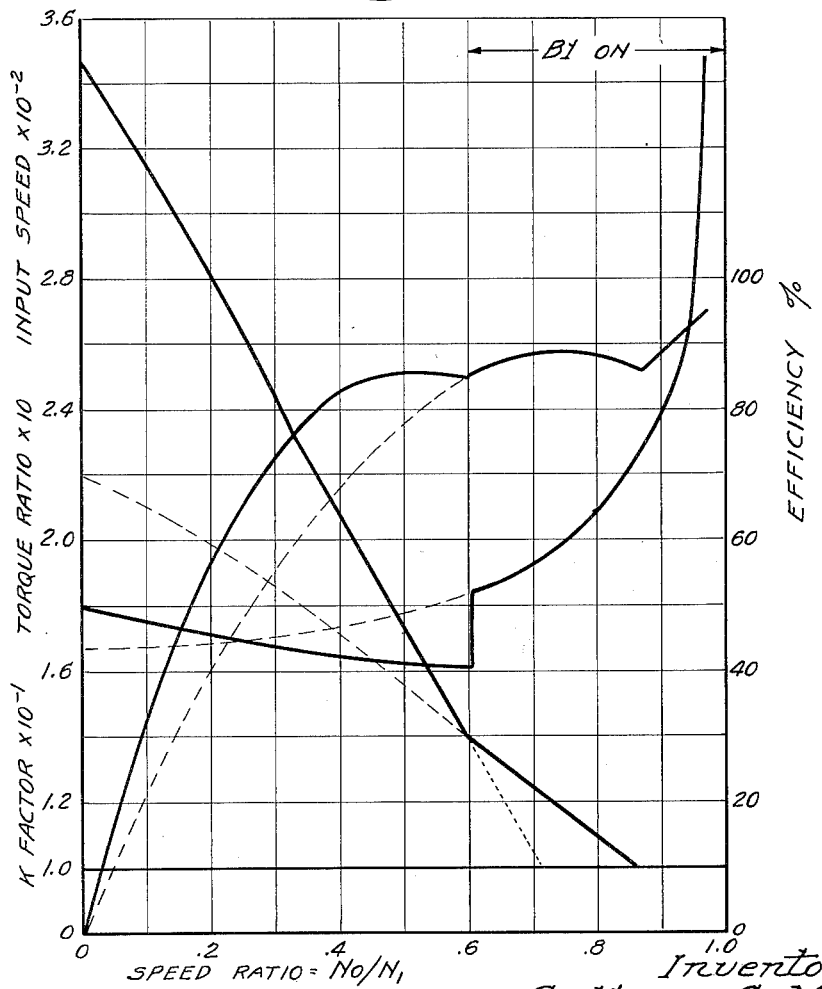
FIG. 4a is a diagram showing typical performance characteristics of the transmission mechanism of FIG. 4.

FIG. 4a shows the performance curves for the transmission arrangement of FIG. 4 with the different control brakes B1 and B2 operative.

In the embodiment of the invention shown in FIG. 5, the torque converter and planetary gearing are connected still differently. In this form the impeller 14, which is directly connected with the drive shaft 10, is also directly connected with a ring gear 70 of the planetary gearing.

The turbine 15, as in the other embodiments, is connected with the driven shaft 11 and the stator 16 is connected with a planet pinion carrier 71 which rotatably mounts a plurality of planetary pinions 72. A sun gear 73 is in mesh with each of the pinions 72 and is held against rotation by means of a band brake B2. A one-way brake B1 is provided for holding the carrier 71 and stator 16 against reverse rotation.

When the band B1 is disengaged, the sun gear 73 functions as a reaction element for the combined hydraulic torque converter and gearing in order to provide a first infinitely variable range of torque conversion. Under these conditions, hydraulic energy is imparted to the fluid circuit by means of impeller vanes 14 and the fluid, after leaving the turbine vanes 15, acts on the stator vanes 16. Mechanical energy is also applied to the stator vanes 16 is in a forward direction, as the forwardly rotating ring gear drives the pinions 72 and carrier 71 forwardly.

With reference to FIG. 6, a further modification of the invention is shown. In this modification, the planetary gearing comprises a sun gear 80 directly connected with the stator 16, a planet pinion carrier 81 directly connected with the impeller 14 and effective to rotatably mount a plurality of planetary pinions 82, and a ring gear 83 in mesh with each of the pinions 82. A brake band B2 is provided for holding the ring gear 83 stationary and a brake band B1 is provided for holding the sun gear 80 and stator 16 stationary.

When the brake band B1 is engaged, the stator 16 is stationary and the torque converter 12 functions substantially without any effect from the planetary gearing. When the brake band B2 is applied the ring gear 83 functions as a reaction element and forward rotation of the impeller 14 and carrier 81 causes the sun gear 80 and stator 16 to be driven forwardly at an overdrive with respect to the speed of rotation of the impeller 14. Thus, the transmission mechanism shown in FIG. 6 provides two differently infinitely variable torque conversion ranges, the one being effective upon the application of brake band B1 and the other being effective upon the application of brake band B2.

The embodiment of the invention disclosed in FIG. 7 is also somewhat different from the other embodiments disclosed heretofore and in this form of the invention the planetary gearing comprises a sun gear 90 directly connected for rotation in unison with the stator 16, a plurality of planetary pinions 91 rotatably mounted upon a carrier 92, and a ring gear 93 in mesh with each of the pinions 91 and directly connected with the impeller 14. A brake band B1 is provided for holding the sun gear 90 and stator 16 stationary and a brake band B2 is provided for holding the carrier 92 stationary.

In the embodiment of the invention shown in FIG. 7, with band B1 engaged, the torque converter 12 functions substantially the same as it would if it were disconnected entirely from the planetary gearing. When the band B2 is engaged, the carrier 92 is stationary and forward rotation of the impeller 14 and ring gear 93 causes the sun gear 90 and stator 16 to rotate reversely at an overdrive with respect to the speed of rotation of the impeller 14. Thus, by the selective engagement of brake bands B1 and B2, the transmission mechanism shown in FIG. 7 also provides two differently infinitely variable torque conversion ranges.

As is apparent from the foregoing description of the present invention, the transmission mechanism disclosed herein provides an interconnected hydraulic torque converter and planetary gearing effective to function at an efficiency which is greater than the efficiency of a conventional transmission combining the same torque converter and planetary gearing in series with each other.

In conventional combinations of hydraulic torque converters and gearing where the torque converter and gearing are interconnected in series with each other, the overall efficiency of the transmission at any driven to driving shaft speed ratio comprises the efficiency of the torque converter, at that speed ratio multiplied by the efficiency of the interconnetced planetary gearing. In the arrangements disclosed herein, the overall efficiency between the drive shaft and the output driven shaft actually is greater than the efficiency of the torque converter itself and likewise, is greater than the efficiency of transmission mechanism arrangements of conventional construction.

In order to illustrate how the overall efficiency of the transmission mechanism shown in FIG. 1, for example, is greater than would be the case with the same torque converter as is shown in FIG. 1 interconnected in series with planetary gearing of the same efficiency as the planetary gearing of FIG. 1, the conditions prevailing at a driven to driving shaft speed ratio of 0.1 will be considered. Under these circumstances the efficiency of the torque converter alone is represented by the extension of the efficiency of curve 30 in FIG. 3 and is substantially equal to 20%. Assuming an efficiency of 95% for the planetary gear set interconnected in series with the torque converter, the overall efficiency of such a transmission mechanism would be 20% multiplied by 95%, or approximately 19% efficient.

With the arrangement shown in FIG. 1, at a driven-to-driving shaft speed ratio of 0.1, the torque on the impeller 14 is split, approximately 70% of the torque being converted to hydraulic energy in the converter 12 and the remaining 30% of the torque going to the planetary gearing 13. With the one-way brake B3 effective, and at a driven-to-driving shaft speed ratio of approximately 0.1, the stator is driven forwardly at a speed ratio of approximately 0.4 with respect to the speed of rotation of the impeller 14. As a result, the torque ratio between the turbine and impeller is increased and the efficiency of the converter itself, with the stator being driven forwardly, goes up from a 20% efficiency to a 25% efficiency. Thus, 70% of the input torque supplied to the converter and gearing is transmitted through the converter to the driven shaft 11 at an efficiency of 25% and thus torque reaches the driven shaft 11 through the torque converter at an efficiency of approximately 17.5%.

Of the 30% of the input torque which goes into the gearing in order to cause the stator 16 to be driven forwardly at a speed ratio of 0.4 relative to the speed of rotation of the impeller, 60% of the torque reaching the gearing is required in order to drive the stator forwardly. The remaining 40% of the torque supplied to the gearing is utilized as reaction torque which is transmitted by the gearing to the output shaft 11 at the gearing efficiency. Thus, assuming the same efficiency of 95% for the gearing as was assumed in the conventional arrangement, the torque reaching the driven shaft 11 through the planetary gearing would reach the shaft at an efficiency of 30% times 40% times 95% which is approximately equal to 11.4%. This efficiency plus the efficiency at which the torque converter operates represents the overall operating efficiency of the arrangement disclosed in FIG. 1 comprising the sum of the efficiencies for the torque reaching the driven shaft through the torque converter and through the gearing because of the torque split and this sum is approximately equal to 28.9%, as is represented by the solid portion of efficiency curve 35 in FIG. 3 at the point where the efficiency curve crosses the driven to driving shaft speed ratio line representing a speed ratio of 0.1.

In view of the foregoing description, it is apparent that the present invention provides arrangements for interconnecting a hydraulic torque converter with planetary gearing so as to substantially improve the overall efficiency, to raise the torque ratio, to more than double the span of the K factor curve and thereby extend the clutch point to a higher driven-to-driving shaft speed ratio than is possible with conventional hydraulic torque converters and planetary gearing combinations.

It is contemplated that numerous changes and modifications may be made in the structural arrangements disclosed herein without departing from the spirit or scope of the invention.

What is claimed is:

1. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; and control means for said gearing respectively effective to change the variation of said portion of torque and, in turn, provide different infinitely variable operating characteristics of the combined torque converter and gearing throughout driven to driving shaft speed ratios from zero-to-one to substantially one-to-one.

2. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; control means for said gearing respectively effective to change the variation of said portion of torque and, in turn, provide different infinitely variable operating characteristics of the combined torque converter and gearing throughout driven to driving shaft speed ratios from zero-to-one to substantially one-to-one, and sensing means responsive to variations in the conditions of operation of the combined torque converter and gearing for selectively activating said control means to provide selection of the different infinitely variable operating characteristics in accordance with said operating conditions variations.

3. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; control means for said gearing respectively effective to change the variation of said portion of torque and, in turn, provide different infinitely variable operating characteristics of the combined torque converter and gearing throughout driven to driving shaft speed ratios from zero-to-one to substantially one-to-one, and sensing means responsive to predetermined variations in relative rotational speeds of certain of said elements of said torque converter and gearing for selectively activating said control means to provide selection of the different infinitely variable operating characteristics in accordance with said predetermined variations in relative rotational speeds of said certain torque converter and gearing elements.

4. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; control means for said gearing respectively effective to change the variation of said portion of torque and, in turn, provide different infinitely variable operating characteristics of the combined torque converter and gearing throughout driven to driving shaft speed ratios from zero-to-one to substantially one-to-one, and sensing means responsive to predetermined variations in relative rotational speeds of certain of said vaned torque converter elements for selectively activating said control means to provide selection of the different infinitely variable operating characteristics in accordance with said predetermined variations in relative rotational speeds of said certain vaned torque converter elements.

5. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; control means for said gearing respectively effective to change the variation of said portion of torque and, in turn, provide different infinitely variable operating characteristics of the combined torque converter and gearing throughout driven to driving shaft speed ratios from zero-to-one to substantially one-to-one, and sensing means responsive to predetermined variations in said driven to driving shaft speed ratios for selectively activating said control means to provide selection of the different infinitely variable operating characteristics in accordance with said predetermined variations in said driven to driving shaft speed ratios.

6. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing having a plurality of members respectively directly interconnected in driving relation with said impeller means and certain of said other elements of said hydraulic torque converter, said planetary gearing being effective to receive an infinitely variable portion of the torque on one of said elements and to vary said portion of torque and, in turn, deliver the varied torque to another of said impeller means or said other elements; control means for said planetary gearing respectively effective to change the variation of said portion of torque and, in turn, provide different infinitely variable operating characteristics of the combined torque converter and gearing throughout driven to driving shaft speed ratios from zero-to-one to substantially one-to-one.

7. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing having a plurality of members respectively directly interconnected in driving relation with said impeller means and certain of said other elements of said hydraulic torque converter, said planetary gearing being effective to receive an infinitely variable portion of the torque on one of said elements and to vary said portion of torque and, in turn, deliver the varied torque to another of said elements; control means for said planetary gearing respectively effective to change the variation of said portion of torque and, in turn, provide different infinitely variable operating characteristics of the combined torque converter and gearing throughout driven to driving shaft speed ratios from zero-to-one to substantially one-to-one, and sensing means responsive to variations in the conditions of operation of the combined torque converter and gearing for selectively activating said control means to provide selection of the different infinitely variable operating characteristics in accordance with said operating conditions variations.

8. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements, certain of said planetary gearing elements being respectively directly interconnected in driving relation with said impeller means and said stator means, said planetary gearing thereby being effective to receive an infinitely variable portion of the torque on one of said elements and to vary said infinitely variable portion of torque and, in turn, deliver the varied infinitely variable portion of torque to the other of said elements; and selectively engageable control devices for different ones of said planetary gearing elements and respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

9. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements, certain of said planetary gearing elements being respectively directly interconnected in driving relation with said impeller means and said stator means, said planetary gearing thereby being effective to receive an infinitely variable portion of the torque on one of said elements and to vary said infinitely variable portion of torque and, in turn, deliver the varied infinitely variable portion of torque to another of said elements; selectively engageable control devices for different ones of said planetary gearing elements and respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices; and means for sensing the driven to driving shaft speed ratio and responsive to predetermined values thereof for controlling the selective engagement of said control devices.

10. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements, certain of said planetary gearing elements being respectively directly interconnected in driving relation with said impeller means and said stator means, said planetary gearing thereby being effective to receive an infinitely variable portion of the torque on one of said elements and to vary said infinitely variable portion of torque and, in turn, deliver the varied infinitely variable portion of torque to another of said elements; and selectively engageable control devices for different ones of said planetary gearing elements and respectively effective upon engagement for providing corresponding different variations of said infinitely variable portion of torque received by the planetary gearing, whereby the ratio of output torque delivered to said driven shaft to the input torque on said drive shaft and the overall efficiency of the combined torque converter and planetary gearing are differently infinitely variable with driven to driving shaft speed ratio changes in accordance with the selective engagement of said control devices.

11. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements, certain of said planetary gearing elements being respectively directly interconnected in driving relation with said impeller means and said stator means, said planetary gearing thereby being effective to receive an infinitely variable portion of the torque on one of said elements and to vary said infinitely variable portion of torque and, in turn, deliver the varied infinitely variable portion of torque to another of said elements; and selectively engageable control devices for different ones of said planetary gearing elements for respectively holding said different ones of said planetary gearing elements stationary for thereby providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

12. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements including a ring gear, a sun gear and a planet pinion carrier, said pinion carrier being directly interconnected in driving relation with said stator means and said sun gear being drivingly interconnected with said impeller means, said planetary gearing thereby being effective to receive an infinitely variable portion of the torque on one of said elements and to vary said infinitely variable portion of torque and, in turn, deliver the varied infinitely variable portion of torque to another of said elements; and selectively engageable control devices for said ring gear and others of said planetary gearing elements and respectively effective upon engagement for providing corresponidng different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

13. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements including a ring gear, a sun gear and planet pinion carrier, said ring gear being directly interconnected in driving relation with said stator means and said sun gear being directly interconnected in driving relation with said impeller means, said planetary gearing thereby being effective to receive an infinitely variable portion of the torque on one of said vaned elements and to vary said infinitely variable portion of torque and, in turn, deliver the varied infinitely variable portion of torque to the other of said vaned elements; and selectively engageable control devices for said planetary pinion carrier and said ring gear and respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

14. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements including a ring gear, a sun gear and planet pinion carrier, said ring gear being directly interconnected in driving relation with said impeller means and said planet pinion carrier being directly interconnected in driving relation with said stator means, said planetary gearing thereby being effective to receive an infinitely variable portion of the torque on one of said vaned elements and to vary said infinitely variable portion of torque and, in turn, deliver the varied infinitely variable portion of torque to the other of said vaned elements; and selectively engageable control devices for said planet pinion carrier and said sun gear and respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

15. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements including a ring gear, a sun gear and planet pinion carrier, said planet pinion carrier being directly interconnected in driving relation with said impeller means and said sun gear being directly interconnected in driving relation with said stator means, said planetary gearing thereby being effective to receive an infinitely variable portion of the torque on one of said vaned elements and to vary said infinitely variable portion of torque and, in turn, deliver the varied infinitely variable portion of torque to the other of said vaned elements; and selectively engageable control devices for said ring gear and said sun gear and respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

16. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements including a ring gear, a sun gear and planet pinion carrier, said ring gear being directly interconnected in driving relation with said impeller means and said sun gear being directly interconnected in driving relation with said stator means, said planetary gearing thereby being effective to receive an infinitely variable portion of the torque on one of said vaned elements and to vary said infinitely variable portion of torque and, in turn, deliver the varied infinitely variable portion of torque to the other of said vaned elements; and selectively engageable control devices for said sun gear and said planet pinion carrier and respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

17. In combination; a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; planetary gearing comprising a plurality of relatively rotatable elements, certain of said planetary gearing elements being respectively directly interconnected in driving relation with said impeller means and said stator means, said planetary gearing thereby being effective to receive an infinitely variable portion of the torque on one of said elements and to vary said infinitely variable portion of torque and, in turn, deliver the varied infinitely variable portion of torque to another of said elements; a selectively engageable control device for said stator means and the one of said planetary gearing elements interconnected therewith and a selectively engageable control device for another of said planetary gearing elements, said control devices being respectively effective upon engagement for providing corresponding different variations of said infinitely variable portion of torque received by the planetary gearing, whereby the ratio of output torque delivered to said driven shaft to the input torque on said drive shaft is differently infinitely variable with driven to driving shaft speed ratio changes in accordance with the selective engagement of said control devices.

18. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid in the toroidal circuit; planetary gearing comprising a first member directly interconnected in driving relation with said impeller means for receiving torque from said drive shaft, a reaction member for enabling the conversion of torque by said gearing and a second member directly interconnected in driving relation with said converter reaction means; the flow of fluid prior to entering said reaction means varying from a relative reverse direction during maximum torque conversion to a relative forward direction during maximum torque conversion by the converter and providing hydraulic energy acting on said reaction means; and control means for said planetary gearing for causing it to drive said reaction means at a fixed rotational speed relative to the speed of said impeller means and thereby providing mechanical energy applied on said reaction means; said hydraulic and mechanical energies which act on said reaction means being in balance throughout said range from maximum to minimum torque conversion to thereby provide infinite variation of torque by the gearing and hydraulic torque converter throughout said torque conversion range.

19. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a first member directly interconnected in driving relation with said impeller means for receiving torque from said drive shaft, a reaction member for enabling the conversion of torque by said gearing and a second member directly interconnected in driving relation with said converter reaction means; the flow of fluid prior to entering said reaction means varying from a relative reverse direction during maximum torque conversion to a relative forward direction during minimum torque conversion by the converter and providing hydraulic energy acting on said reaction means; and a brake for the reaction member of said planetary gearing for causing it to drive said reaction means at a fixed rotational speed relative to the speed of said impeller means and thereby providing mechanical energy applied on said reaction means; said hydraulic and mechanical energies which act on said reaction means being in balance throughout said range from maximum to minimum torque conversion to thereby provide infinite variation of torque by the gearing and hydraulic torque converter throughout the operational range of the converter and gearing.

20. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a sun gear directly interconnected in driving relation with said impeller means for receiving torque from said drive shaft, a reaction ring gear for enabling the conversion of torque by said gearing and a planet pinion carrier directly interconnected in driving relation with said converter reaction means; the flow of fluid prior to entering said reaction means varying from a relative reverse direction during maximum torque conversion to a relative forward direction during minimum torque conversion by the converter and providing hydraulic energy acting on said reaction means; and a brake for said ring gear for causing said planetary gearing to drive said reaction means at a fixed rotational speed relative to the speed of said impeller means and thereby providing mechanical energy applied on said reaction means; said hydraulic and mechanical energies which act on said reatcion means being in balance throughout said range from maximum to minimum torque conversion to thereby provide infinite variation of torque by the gearing and hydraulic torque converter throughout said torque conversion range.

21. In combination; a drive shaft; a driven shaft; a hydraulic torque converter having a plurlity of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a sun gear directly interconnected in driving relation with said impeller means for receiving torque from said drive shaft, a reaction planet pinion carrier for enabling the conversion of torque by said gearing and a ring gear directly interconnected in driving relation with said converter reaction means; the flow of fluid prior to entering said reaction means varying from a relative reverse direction during maximum torque conversion to a relative forward direction during minimum torque conversion by the converter and providing hydraulic energy acting on said reaction means; and brake means for said planet pinion carrier for causing the planetary gearing to drive said reaction means at a fixed forward rotational speed relative to the speed of said impeller means and thereby providing mechanical energy applied on said reaction means; said hydraulic and mechanical energies which act on said reaction means being in balance throughout said range from maximum to minimum torque conversion to thereby provide infinite variation of torque by the gearing and hydraulic torque converter throughout said torque conversion range.

22. In combination; a drive shaft; a driven shaft; a hydraulic torque converter having a plurlity of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a ring gear directly interconnected in driving relation with said impeller means for receiving torque from said drive shaft, a reaction sun gear for enabling the conversion of torque by said gearing and a planet pinion carrier directly interconnected in driving relation with said converter reaction means; the flow of fluid prior to entering said reaction means varying from a relative reverse direction during maximum torque conversion to a relative forward direction during minimum torque conversion by the converter and providing hydraulic energy acting on said reaction means; and brake means for said sun gear for causing the planetary gearing to drive said reaction means at a fixed rotational speed relative to the speed of said impeller means and thereby providing mechanical energy applied on said reaction means; said hydraulic and mechanical energies which act on said reaction means being in balance throughout said range from maximum to minimum torque conversion to thereby provide infinite variation of torque by the gearing and hydraulic torque converter throughout said torque conversion range.

23. In combination; a drive shaft; a driven shaft; a hydraulic torque converter having a plurlity of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a planet pinion carrier directly interconnected in driving relation with said impeller means for receiving torque from said drive shaft, a reaction ring gear for enabling the conversion of torque by said gearing and a sun gear directly interconnected in driving relation with said converter reaction means; the flow of fluid prior to entering said reaction means varying from a relative reverse direction during maximum torque convertion to a relative forward direction during minimum torque conversion by the converter and providing hydraulic energy acting on said reaction means; and brake means for said ring gear for causing the planetary gearing to drive said reaction means at a fixed rotational speed relative to the speed of said impeller means and thereby providing mechanical energy applied on said reaction means; said hydraulic and mechanical energies which act on said reaction means being in balance throughout said range from maximum to minimum torque conversion to thereby provide infinite variation of torque by the gearing and hydraulic torque converter throughout said torque conversion range.

24. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a ring gear directly interconnected in driving relation with said impeller means for receiving torque from said drive shaft, a reaction planet pinion carrier for enabling the conversion of torque by said gearing and a sun gear directly interconnected in driving relation with said converter reaction means; the flow of fluid prior to entering said reaction means varying from a relative reverse direction during maximum torque conversion to a relative forward direction during minimum torque conversion by the converter and providing hydraulic energy acting on said reaction means; and brake means for said planet pinion carrier for causing said planetary gearing to drive said reaction means at a fixed backward rotational speed relative to the speed of said impeller means and thereby providing mechanical energy applied on said reaction means; said hydraulic and mechanical energies which act on said reaction means being in balance throughout said range from maximum to minimum torque conversion to thereby provide infinite variation of torque by the gearing and hydraulic torque converter throughout said torque conversion range.

25. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion or torque by said converter; planetary gearing comprising a first member directly interconnected in driving relation with said impeller means for receiving torque from said drive shaft, a reaction member for enabling the conversion of torque by said gearing and a second member directly interconnected in driving relation with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first control device for said planetary gearing and engageable for causing the gearing to drive said reaction means at a fixed rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; and a second control device for holding said reaction means stationary for providing a second range of infinitely variable torque conversion by the hydraulic torque converter.

26. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a first member directly interconnected in driving relation with said impeller means for receiving torque from said drive shaft, a reaction member for enabling the conversion of torque by said gearing and a second member directly interconnected in driving relation with said converter reaction means; the direction of flow of the fluid prior to entering said reaction means varying substantially infinitely between relative reverse and forward directions throughout the range of torque conversion by the converter and the fluid providing hydraulic energy acting on said reaction means; and a control device for said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said control device and thereby being effective to provide infinitely variable torque conversion by the gearing and hydraulic torque converter.

27. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a first member drivingly interconnected with said impeller means for receiving torque from said drive shaft, a reaction member for enabling the conversion of torque by said gearing and a second member drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first control device for said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; a second control device for holding said reaction means stationary for providing a second range of infinitely variable torque conversion by the hydraulic torque converter; and other means including a device respectively engageable for drivingly interconnecting said reaction member and said vaned turbine means whereby the reaction member is driven at speeds variable in accordance with variations in the speed of said turbine means and said planetary gearing is thereby effective to drive said converter reaction means infinitely variably in accordance with variations in the ratio of impeller to turbine speeds to thereby provide a third infinitely variable range of torque conversion.

28. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a first member drivingly interconnected with said impeller means for receiving torque from said drive shaft, a reaction member for enabling the conversion of torque by said gearing and a second member drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; and means including a device respectively engageable for drivingly interconnecting said planetary gearing reaction member and said vaned turbine means whereby the reaction member is driven at speeds variable in accordance with variations in the speed of said turbine means thereby providing mechanical energy applied on said reaction means; said hydraulic and mechanical energies which act on said reaction means during the engagement of said device being in balance throughout the engagement of said device and thereby being effective to provide infinitely variable torque conversion by the gearing and hydraulic torque converter.

29. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a first member drivingly interconnected with said impeller means for receiving torque from said drive shaft, a reaction member for enabling the conversion of torque by said gearing and a second member drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; and a second planetary gear set having a control device engageable for drivingly interconnecting said reaction member of said first set of planetary gearing and said vaned turbine means whereby the reaction member is driven at speeds variable in accordance with variations in the speed of said turbine means thereby providing mechanical energy applied on said reaction means; said hydraulic and mechanical energies which act on said reaction means during the engagement of said device being in balance throughout the engagement of said device and thereby being effective to provide infinitely variable torque conversion by the gearing and hydraulic torque converter.

30. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a first member drivingly interconnected with said impeller means for receiving torque from said drive shaft, a reaction member for enabling the conversion of torque by said gearing and a second member drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a second planetary gear set drivingly interconnecting said reaction member of said first planetary gear set with said turbine means; and a one-way brake for an element of said second planetary gear set effective upon engagement to cause said reaction member of said first planetary gear set to be driven at speeds variable in accordance with variations in the speed of said turbine means for thereby providing mechanical energy applied on said reaction means; said hydraulic and mechanical energies which act on said reaction means during the engagement of said one-way brake being in balance throughout the engagement of said one-way brake and thereby being effective to provide infinitely variable torque conversion by the gearing and hydraulic torque converter.

31. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a first member drivingly interconnected with said impeller means for receiving torque from said drive shaft, a reaction member for enabling the conversion of torque by said gearing and a second member drivingly interconnected with said converter reaction means; the direction of flow of the fluid prior to entering said reaction means varying substantially infiintely between relative reverse and forward directions throughout the range of torque conversion by the converter and the fluid providing hydraulic energy acting on said reaction means; a control device for said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said control device being in balance throughout the engagement of said control device and thereby being effective to provide a first range of infinitely variable torque conversion by the gearing and hydraulic torque converter; and other means including a device respectively engageable for drivingly interconnecting said reaction member and said vaned turbine means whereby the reaction member is driven at speeds variable in accordance with variations in the speed of said turbine means and said planetary gearing is thereby effective to drive said converter reaction means infinitely variably in accordance with variations in the ratio of impeller to turbine speeds to thereby provide a second infinitely variable range of torque conversion.

32. In combination; a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; planetary gearing comprising a first member drivingly interconnected with said impeller means for receiving torque from said drive shaft, a reaction member for enabling the conversion of torque by said gearing and a second member drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a control device for said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said control device being in balance throughout the engagement of said control device and thereby being effective to provide a first range of infinitely variable torque conversion by the gearing and hydraulic torque converter; a second planetary gear set drivingly interconnecting said reaction member of said first planetary gear set with said turbine means; and a one-way brake for an element of said second planetary gear set effective upon engagement to cause said reaction member of said first planetary gear set to be driven at speeds variable in accordance with variations in the speed of said turbine means whereby said first set of planetary gearing is effective to drive said converter reaction means infinitely variably in accordance with variations in the ratio of impeller to turbine speeds to thereby provide a second infinitely variable range of torque conversion.

33. In combination: a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a sun gear drivingly interconnected with said impeller means for receiving torque from said drive shaft, a reaction ring gear for enabling the conversion of torque by said gearing and a planet pinion carrier drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first device for controlling said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; said first planetary gear set having a predetermined ring gear to sun gear ratio; a second planetary gear set having a sun gear drivingly connected with the reaction ring gear of the first planetary gear set, a ring gear drivingly connected with said turbine means and a reaction planet pinion carrier; said second planetary gear set having a predetermined ring gear to sun gear ratio; and a one-way brake for said reaction planet pinion carrier of said second planetary gear set engageable to complete a drive between said turbine means and said reaction ring gear of said first planetary gear set whereby said first planetary gear set is effective to drive said reaction means infinitely variable forwardly while the rotational speed of said impeller means exceeds the product of the rotational speed of said turbine means multiplied by the ring gear to sun gear ratio of the first planetary gear set times the ring gear to sun gear ratio of the second planetary gear set and infinitely variably reversely when the rotational speed of said impeller means is less than said product to thereby provide a different range of mechanical energy applied on said reaction means and, in turn, provide a second range of infinitely variable torque conversion.

34. In combination: a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a sun gear drivingly interconnected with said impeller means for receiving torque from said drive shaft, a reaction ring gear for enabling the conversion of torque by said gearing and a planet pinion carrier drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first device for controlling said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; a second control device for holding said reaction means stationary for providing a second range of infinitely variable torque conversion; a second planetary gear set having a sun gear drivingly connected with the reaction ring gear of the first planetary gear set, a ring gear drivingly connected with said turbine means and a reaction planet pinion carrier; and a third control device comprising a one-way brake for said reaction planet pinion carrier of said second planetary gear set engageable to complete a drive between said turbine means and said reaction ring gear of said first planetary gear set whereby said first planetary gear set is effective to drive said reaction means infinitely variably forwardly under certain conditions and infinitely variably reversely under other conditions to thereby provide a different range of mechanical energy applied on said reaction means and, in turn, provide a third range of infinitely variable torque conversion.

35. The combination as defined in claim 34 and including means for sensing variations in the driven to driving shaft speed ratio for selectively actuating said control devices.

36. In combination: a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a sun gear drivingly interconnected with said impeller means for receiving torque from said drive shaft, a reaction ring gear for enabling the conversion of torque by said gearing and a planet pinion carrier drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first device for controlling said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; a second control device for holding said reaction means stationary for providing a second range of infinitely variable torque conversion; said first planetary gear set having a predetermined ring gear to sun gear ratio; a second planetary gear set having a sun gear drivingly connected with the reaction ring gear of the first planetary gear set, a ring gear drivingly connected with said turbine means and a reaction planet pinion carrier; said second planetary gear set having a predetermined ring gear to sun gear ratio; and a third control device comprising a one-way brake for said reaction planet pinion carrier of said second planetary gear set engageable to complete a drive from said turbine means to said reaction ring gear of said first planetary gear set whereby said first planetary gear set is effective to drive said reaction means infinitely variably forwardly while the rotational speed of said impeller means exceeds the product of the rotational speed of said turbine means multiplied by the ring gear to sun gear ratio of the first planetary gear set times the ring gear to sun gear ratio of the second planetary gear set and infinitely variably reversely when the rotational speed of said impeller means is less than said product to thereby provide a different range of mechanical energy applied on said reaction means and, in turn, provide a third range of infinitely variable torque conversion.

37. The combination as defined in claim 36 and including means for sensing variations in the driven to driving shaft speed ratios for selectively actuating said control devices.

38. In combination: a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a sun gear drivingly interconnected with said impeller means for receiving torque from said drive shaft, a reaction ring gear for enabling the conversion of torque by said gearing and a planet pinion carrier drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first device for controlling said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; a second control device for holding said reaction means stationary for providing a second range of infinitely variable torque conversion; a second planetary gear set having a sun gear drivingly connected with the reaction ring gear of the first planetary gear set, a ring gear drivingly connected with said turbine means and a reaction planet pinion carrier; a third control device comprising a one-way brake for said reaction planet pinion carrier of said second planetary gear set engageable to complete a drive from said turbine means to said reaction ring gear of said first planetary gear set whereby said first planetary gear set is effective to drive said reaction means infinitely variably forwardly under certain conditions and infinitely variably reversely under other conditions to thereby provide a different range of mechanical energy applied on said reaction means and, in turn, provide a third range of infinitely variable torque conversion; the overall efficiency and torque ratio varying differently over said different torque conversion ranges; and means for actuating said different control devices to provide selection of said different torque conversion ranges and, in turn, enable selection of the overall efficiency and torque ratio throughout the range of driven to driving shaft speed ratios.

39. In combination: a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a sun gear drivingly interconnected with said impeller means for receiving torque from said drive shaft, a reaction ring gear for enabling the conversion of torque by said gearing and a planet pinion carrier drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first device for controlling said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; a second control device for holding said reaction means stationary for providing a second range of infinitely variable torque conversion; a second planetary gear set having a sun gear drivingly connected with the reaction ring gear of the first planetary gear set, a ring gear drivinly connected with said turbine means and a reaction planet pinion carrier; a third control device comprising a one-way brake for said reaction planet pinion carrier of said second planetary gear set engageable to complete a drive from said turbine means to said reaction ring gear of said first planetary gear set whereby said first planetary gear set is effective to drive said reaction means infinitely variably forwardly under certain conditions and infinitely variably reversely under other conditions to thereby provide a different range of mechanical energy applied on said reaction means and, in turn, provide a third range of infinitely variable torque conversion; the overall efficiency of the torque converter and planetary gearing being higher and reaching a peak at different driven to driving shaft speed ratios during operation in said different infinitely variable torque conversion ranges; and means for actuating said control devices to provide selection of said different torque conversion ranges and in turn, enable operation at said peak overall efficiencies throughout the range of driven to driving shaft speed ratios.

40. In combination: a drive shaft; a driven shaft; a hydraulic torque converter having a plurality of vaned elements together defining a substantially toroidal fluid circuit; all of said elements being rotatable about a common axis; said elements comprising vaned impeller means connected with said drive shaft for receiving torque from said drive shaft and for circulating the fluid through said toroidal circuit and thereby imparting kinetic energy to the fluid, vaned turbine means connected with said driven shaft for absorbing kinetic energy from the fluid, and vaned reaction means effective to change the direction of flow of the fluid prior to its reentry into said impeller means for enabling the conversion of torque by said converter; a first set of planetary gearing comprising a sun gear drivingly interconnected with said impeller means for receiving torque from said drive shaft, a reaction ring gear for enabling the conversion of torque by said gearing and a planet pinion carrier drivingly interconnected with said converter reaction means; the direction of flow of the fluid prior to entering said reaction means varying substantially infinitely between relative reverse and forward directions throughout the range of torque conversion by the converter and the fluid providing hydraulic energy acting on said reaction means; a first device for controlling said planetary gearing and engageable for causing the gearing to drive said reaction means at a fixed forward rotational speed relative to the speed of said impeller means and thereby providing mechanical energy applied on said reaction means; said hydraulic and mechanical energies which act on said reaction means during the engagement of said first control device being in balance throughout the engagement of said first control device and thereby being effective to provide a first range of infinitely variable torque conversion by the gearing and hydraulic torque converter; a second control device for holding said reaction means stationary for providing a second range of infinitely variable torque conversion; said first planetary gear set having a predetermined ring gear to sun gear ratio; a second planetary gear set having a sun gear drivingly connected with the reaction ring gear of the first planetary gear set, a ring gear drivingly connected with said turbine means and a reaction planet pinion carrier; said second planetary gear set having a predetermined ring gear to sun gear ratio; a third control device comprising a one-way brake for said reaction planet pinion carrier of said second planetary gear set engageable to complete a drive from said turbine means to said reaction ring gear of said first planetary gear set whereby said first planetary gear set is effective to drive said reaction means infinitely variably forwardly while the rotational speed of said impeller means exceeds the product of the rotational speed of said turbine means multiplied by the ring gear to sun gear ratio of the first planetary gear set times the ring gear to sun gear ratio of the second planetary gear set and infinitely variably reversely when the rotational speed of said impeller means is less than said product to thereby provide a different range of mechanical energy applied on said reaction means and, in turn, provide a third range of infinitely variable torque conversion; the overall efficiency of the torque converter and planetary gearing being higher and reaching a peak at different driven to driving shaft speed ratios during operation in said different infinitely variable torque conversion ranges; and means for actuating said control devices to provide selection of said different torque conversion ranges and, in turn, enable operation at said peak overall efficiencies throughout the range of driven to driving shaft speed ratios.

41. In combination: a drive shaft; a driven shaft; a hydraulic torque converter having a plurality of vaned elements together defining a substantially toroidal fluid circuit; all of said elements being relatively rotatable about a common axis; and said elements including a vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; and control means for said gearing respectively effective to change the variation of said portion of torque and, in turn, provide different infinitely variable torque conversion ranges throughout driven to driving shaft speed ratios from zero-to-one to substantially one-to-one, the overall efficiency and torque ratio varying differently over said different torque conversion ranges; and means for actuating said control means to provide selection of said different torque conversion ranges and, in turn, enable selection of the overall efficiency and torque ratio throughout the range of driven to driving shaft speed ratios.

42. In combination: a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; and control means for said gearing respectively effective to change the variation of said portion of torque and, in turn, provide different infinitely variable torque conversion ranges throughout driven to driving shaft speed ratios from zero-to-one to substantially one-to-one, the overall efficiency and torque ratio varying differently over said different torque conversion ranges; and means for actuating said control means selectively in accordance with variations in said driven to drive shaft speed ratios to provide selection of said different torque conversion ranges and, in turn, enable selection of the overall efficiency tand torque ratio throughout the range of driven to driving shaft speed ratios.

43. In combination: a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; and control means for said gearing respectively effective to change the variation of said portion of torque and, in turn, provide different infinitely variable torque conversion ranges throughout driven to driving shaft speed ratios from zero-to-one to substantially one-to-one, the overall efficiency of the torque converter and gearing being higher and reaching a peak at different driven to driving shaft speed ratios during operation in said different infinitely variable torque conversion ranges; and means for actuating said control means to provide selection of said different torque conversion ranges and, in turn, enable operation at said peak overall efficiencies throughout the range of driven to driving shaft speed ratios.

44. In combination: a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; and control means for said gearing respectively effective to change the variation of said portion of torque and, in turn, provide different infinitely variable torque conversion ranges throughout driven to driving shaft speed ratios from zero-to-one to substantially one-to-one, the overall efficiency of the torque converter and gearing being highest at relatively low driven to driving shaft speed ratios during operation of a first one of said control means, highest at relative intermediate driven to driving shaft speed ratios during operation of a second one of said control means and highest at relatively high driven to driving shaft speed ratios during operation of a third one of said control means; and means for actuating said control means to provide selection of said different torque conversion ranges in a manner such that operation will at all times be at one of said highest overall efficiencies.

45. In combination: a drive shaft; a driven shaft; a hydraulic torque converter having a plurality of vaned elements together defining a substantially toroidal fluid circuit; all of said elements being relatively rotatable about a common axis and said elements including vaned impeller means drivingly connected with said drive shaft, vaned turbine means drivingly connected with said driven shaft, and vaned reaction means; gearing directly interconnected in driving relation between said impeller means and certain of said other elements of said hydraulic torque converter, said gearing being effective to receive an infinitely variable portion of the torque on one of said elements and to vary said portion of torque and, in turn, deliver the varied torque to another of said elements; and control means for said gearing respectively effective to change the variation of said portion of torque and, in turn, provide different infinitely variable torque conversion ranges throughout driven to driving shaft speed ratios from zero-to-one to substantially one-to-one, the overall efficiency of the torque converter and gearing being highest at relatively low driven to driving shaft speed ratios during operation of a first one of said control means, highest at relatively intermediate driven to driving shaft speed ratios during operation of a second one of said control means and highest at relatively high driven to driving shaft speed ratios during operation of a third one of said conrol means; and means for actuating said control means selectively in accordance with variations in said driven to driving shaft speed ratios to provide selection of said different torque conversion ranges in a manner such that operation will at all times be at one of said highest overall efficiencies.

46. In combination: a drive shaft; a driven shaft; a hydraulic torque converter having a plurality of vaned elements together defining a substantially toroidal fluid circuit; all of said elements being rotatable about a common axis; one of said elements being connected to rotate directly with said drive shaft; a second of said elements being connected to rotate directly with said driven shaft; planetary gearing drivingly connecting said drive shaft with a third of said elements; and a plurality of selectively operable brake means for different elements of said planetary gearing, said brake means being respectively engageable to hold said third torque converter element stationary to cause the same to function as a reaction element effective to change the direction of fluid flow in said toroidal circuit and thereby enable infinitely variable conversion of torque by the converter over a first range or to complete a drive from said drive shaft to said third converter element and thereby provide different overall operating characteristics of the hydraulic torque converter and, in turn, enable infinitely variable conversion of torque by the converter over a different range.

References Cited in the file of this patent
UNITED STATES PATENTS

| | | |
|---|---|---|
| 2,146,569 | Fichtner | Feb. 7, 1939 |
| 2,280,015 | Tipton | Apr. 14, 1942 |
| 2,484,011 | Brunken et al. | Oct. 11, 1949 |
| 2,572,007 | Burtnett | Oct. 23, 1951 |